United States Patent Office 2,773,041
Patented Dec. 4, 1956

2,773,041

DEFOAMING COMPOSITION

Rudolph H. Larsen, Oakland, and Shek Ying Lam, San Francisco, Calif., assignors to Fred Bresee, Jr., doing business as Balab, Oakland, Calif.

No Drawing. Application July 16, 1951,
Serial No. 237,076

1 Claim. (Cl. 252—358)

This invention relates generally to methods and compositions for eliminating or controlling objectionable foaming of latex or latex emulsions, and to formulated products containing such compositions.

Latex or latex emulsions containing various synthetic resins are now being extensively manufactured and sold for use in formulating various products and are being sold for use in paints of the type containing solid fillers or pigments suspended in water.

In the processing, handling and use of such products and compositions, foaming has been a serious problem. Foaming occurs during processing and handling of the latex emulsion.

However of more serious consequence is foaming that tends to take place when the latex emulsion is formulated with other ingredients, as for example the ingredients of coating materials or paints. Foaming at this time tends to interfere with processing and handling, and injures the quality of the final product. When used by the customer any amount of foaming may seriously interfere with the smoothness of the applied coating. Such objectionable foaming may occur when the customer stirs or mixes the product before its use, or when the composition is applied to a surface by brush or spray.

Prior to the present invention, various materials and compounds were tried for solving this foaming difficulty, but without substantial success. Conventional defoamers, such as oils, alcohols, waxes, silicones and the like, tend to have only a temporary, if any, defoaming effect. Thus when such a conventional defoamer is added to the latex emulsion, there is an initial defoaming effect but after a period of time the emulsion is again subject to foam formation upon further agitation.

In general it is an object of the present invention to provide a defoaming product and method which will provide a practical solution to the above difficulty.

Another object of the invention is to provide a defoamer product and method which can be successfully used with latex emulsions, and which will have a substantially permanent rather than a temporary defoaming effect.

Another object of the invention is to provide a defoaming product of the above character which can be used in latex emulsions without in any way interfering with use of the emulsion for various purposes, such as formulating paints, and which will likewise tend to prevent foaming of such paint products after they have been formulated with the latex.

Another object of the invention is to provide a latex emulsion which has been treated by the addition of a product such as described above, and which is characterized by lack of tendency to foam when agitated by itself or after being incorporated in various formulated products.

Additional objects and features of the invention will appear from the following description in which the preferred embodiment of the invention has been set forth in detail.

The present defoaming composition consists of a stable oil-water emulsion in which there is dispersed a hydrous deflocculated (i. e. finely divided and dispersed as a stable suspension) metallic pigment that is substantially insoluble in oil and water. The metallic pigment can be advantageously formed as a reaction product during manufacture of the composition. As an alternative to such practice the pigment may be dispersed in water either by mechanical dispersion methods, or by virtue of its autodispersibility, and emulsion then added to the composition. Also the pigment may be one which is dispersible in oil, and may be added to the composition as an oil dispersion. The most desirable procedure to follow with respect to providing the metallic pigment is dependent in part upon the particular pigment being used, and characteristics which may be desired in the final composition. In addition to the foregoing ingredients the composition contains an organic salt such as one formed by the reaction of a fatty acid with an amine.

Relatively small amounts of our composition have been found to be highly effective in suppressing or controlling foam formation in latex emulsions, and to have a lasting rather than a temporary effect. While the composition presents a solution to a difficult problem in preventing foaming of latex emulsions, it has other industrial applications, as for example to prevent foaming of sulphite liquors in the wood pulp industry, and foaming of protein containing liquors such as solutions or slurries containing protein glue.

The specific ingredients employed are selected in such a manner as to avoid undesirable reactions with the resin of the latex, or the ingredients with which the latex is to be formulated. Also care is taken in the selection of the specific ingredients to avoid introduction of undesirable contaminants into either the latex emulsion or the final formulated product.

The oil-water emulsion is prepared from any one of a wide variety of oils. Thus we can employ mineral oils such as various grades of kerosene, so-called mineral oil or white oil, and similar petroleum fractions. It is also possible to use various vegetable oils such as cotton seed, sesame, coconut, peanut, castor, corn oil and the like. Also animal oils can be employed such as sardine or other fish oil, lard and tallow. It is desirable that the oil selected be sufficiently purified or refined to avoid introduction of other objectionable contaminants.

In order to form the oil-water emulsion it is necessary to use one or more suitable emulsifying assistants. For this purpose we have found it desirable to use any one of several organic acids, such as fatty acids like stearic, palmitic, lauric, oleic and linoleic. In addition we can employ crude fatty acids extracted from vegetable oils such as soy bean, cotton seed, castor and coconut. A relatively inexpensive source of fatty acid is one obtained from foods resulting from the refining of vegetable oil.

As will be presently explained in greater detail, the emulsifying assistant reacts with an organic base employed to form an oil and water soluble organic salt, like the salt formed by the reaction of monoethanolamine with stearic acid. This reaction is desirable in that it enhances the defoaming characteristics of the final composition, and in addition it appears to provide a vehicle for carrying the deflocculated pigment, and for dispersing the pigment in material into which the composition is introduced. In other words, it appears to hold or retain the pigment in dispersed and deflocculated condition.

In addition to use of the foregoing ingredients, it is desirable to employ one or more organic emulsifying agents. Such agents assist in maintaining a stable emulsion. A suitable emulsifier for this purpose is a poly-oxyethylene ester of mixed fatty acid and resin acids, such as a product sold under the trade name of Atlas Renex (Atlas Powder Company). More specifically, Atlas Renex consists of poly-oxyethylene esters of mixed fatty and resin acids contained in "tall oil." Tall oil is a by-product of the paper industry and consists principally of oleic, linoleic and abietic acids. The polyoxyethylene ester of oleic acid present in Renex has a chemical structure that can be expressed as $$C_{17}H_{33}COO(CH_2CH_2O)_{15}CH_2CH_2OH$$

and has a molecular weight of 987.29, that of linoleic acid can be expressed as $$C_{17}H_{31}COO(CH_2CH_2O)_{15}CH_2CH_2OH$$

and has a molecular weight of 985.27, and that of abietic acid can be expressed as $$C_{19}H_{29}COO(CH_2CH_2O)_{15}CH_2CH_2OH$$

and has a molecular weight of 1009.27.

Another emulsifying agent that can be used is the product sold under the trade-name of Triton X–45 (Rohm & Haas), which is an alkyl aryl polyethoxyethanol having the formula

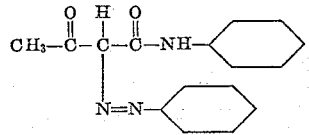

with a molecular weight of 426.58.

Further agents that can be used are products sold under the trade-names of Trem 014 and Trem 024 (Griffin Chemical Co.). Trem 014 is poly-oxyethylene mono oleate having the formula $$C_{17}H_{33}COO(CH_2CH_2O)_8CH_2CH_2OH$$

with a molecular weight of 678.67. Trem 024 is poly-oxyethylene di-oleate having the formula $$C_{17}H_{33}COO(CH_2CH_2O)_8CH_2CH_2OOCH_{33}C_{17}$$

with a molecular weight of 943.11. In general the emulsifying agent employed should be a non-ionic surface active agent, and should be compatible with the other ingredients employed. Also it should have a suitable hydrophile-lipophile balance (HLB). In this connection the Atlas Renex mentioned above has an HLB index of 13.5.

As previously mentioned, it is desirable to form the finely dispersed or deflocculated metallic pigment as a reaction product while the composition is being formulated. Thus any one or more of many soluble metallic salts may be reacted in water solution with one or more organic bases employed to form a deflocculated pigment. Particular reference can be made to the chlorides and sulphates of aluminum, copper, iron, tin, cobalt, magnesium, manganese and nickel, and the chlorides of barium, zinc and calcium. As an alternative to this procedure the pigment can be supplied or prepared as a dispersion in water, and introduced into the composition at the time the same is compounded. When the pigment is supplied in this manner, we can use such compounds as aluminum hydroxide or alumina hydrate, calcium carbonate, barium sulphate, zinc sulphate, magnesium carbonate, and titanium oxide. The pigments just mentioned should be in finely divided form and should have such characteristics as to enable the same to be readily dispersed in the composition to form a deflocculated metallic pigment.

In addition to the use of water soluble pigment forming metallic salts, and relatively insoluble pigments dispersible in water, we can employ relatively insoluble pigments dispersible in oil. Examples of such oil dispersible pigments include flushed alumina hydrate, barium sulphate, "iron blue" (ferrocyanide of iron) and organic pigments such as carbon black, "hansa yellow," and "benzedine yellow." Hansa yellows are azo dye made by diazotizing amines or nitro or chloronitro amines and coupling the diazonium compounds to acetoacetanilide or its derivatives. Its molecular formula is stated as

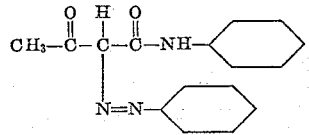

Benzidene yellows are couplings made by using tetrazo compounds of benzidine derivatives and acetoacetanilide or its derivatives and its molecular formula is stated as

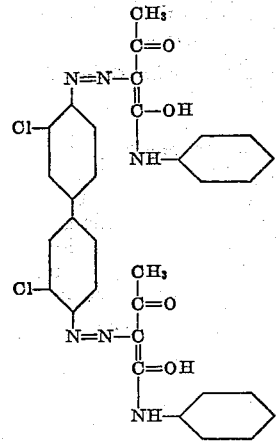

The pigments just mentioned can be purchased on the market dispersed in oil, or they can be dispersed in a portion of the oil of the composition as a preliminary step during compounding.

The organic base employed is preferably one which is normally liquid, which is capable of reacting with a metallic salt to form the desired deflocculated pigment (assuming that the pigment is formed in this fashion), and which is also capable of reacting with the fatty acid to form one or more oil and water soluble by-product salts which enhance the defoaming action. Various ammonia derivative organic bases can be employed including amines such as mono, di or triethanolamine, morpholine, furfural amine and 1 hydroxy, 2 heptadecenyl glyoxalidine, sold under the trade name of Amine 220. All of the foregoing organic bases, with the exception of morpholine and furfural amine, are aliphatic amines which are liquid at normal temperature.

Assuming that the metallic pigment is formed as a reaction product during formulation, the reaction between the organic base and the metallic salt occurs in water solution and serves to form a finely dispersed hydrous deflocculated material which is substantially insoluble in water. By way of example, the reaction of monoethanolamine with aluminum chloride in water solution forms a highly hydrated deflocculated aluminum pigment which is a precipitated aluminum hydrate and/or an aluminum hydroxide complex. This is the general reaction which takes place in formulating our composition according to Example 1, to follow.

During formulation of our composition care is taken to avoid the formation of one or more relatively insoluble metal soaps. Soluble metal salts tend to react with fatty acids at temperatures of the order of 50° C., or higher, to form such soaps. Thus in a composition containing metal compounds and free fatty acid, one would normally expect to find more or less metal soap as a result of direct or side reactions. In our preferred formulating method (e. g. Example No. 1) care is taken to maintain the ingredients at a relatively low temperature while unreacted metal salt is in intimate association with the fatty acid, and the temperature is not elevated until the reaction between the metal salt and the amine has taken place. Hereafter the composition is relatively stable and may be stored at room temperatures of the order of from 30 to 40° C., without deterioration and particularly without the formation of any substantial amount of metal soaps.

In the following examples, the materials employed are both liquids and solids and, accordingly, it is to be understood that all proportions are expressed as percent by weight.

Example 1

By way of example, we have prepared a defoaming composition from kerosene, stearic acid, Atlas Renex, monoethanolamine, aluminum chloride and water. The proportions of the ingredients were as follows:

55.25% kerosene (deodorized)
13.2% stearic acid (Neo Fat 1-58)
3.6% Atlas Renex
6.5% aluminum chloride
1.95% monoethanolamine
19.5% water In formulating the above ingredients the stearic acid was first melted together with a part of the kerosene at a temperature of about 70° C. After the stearic acid had melted the rest of the kerosene was added, and the batch was then cooled to about 30 to 35° C. The Renex was added while the batch was being stirred, and then the aluminum chloride and monoethanolamine were added in solution with the water content, and the batch agitated or whipped to form a final emulsified product. The final composition was a stable whitish emulsion.

The above composition formed a highly effective defoaming agent when added to synthetic latex emulsions, such as a latex emulsion of the vinyl type containing 50% solids. One-half of one percent of our composition when added to such a latex emulsion completely eliminated foam formation. The defoaming action was permanent rather than temporary. In other words, after having added the defoamer, the material thereafter required no further defoaming treatment, but failed to exhibit foaming tendencies upon repeated subsequent agitations. Upon incorporating such a treated latex emulsion in a paint of the water suspended solid pigment type, no further foaming took place during processing and milling of the paint, and after extended shelf storage, the paint when used exhibited no foaming tendencies.

The composition prepared according to the above Example No. 1 was also found effective in preventing foaming of sulphite liquors such as are encountered in the wood pulp industry, and proteinaceous liquors such as solutions or slurries containing vegetable protein glue.

Example 2

As another specific example, we prepared a composition containing ingredients similar to those used in Example 1, but the pigment was added as a water dispersion instead of being formed as a reaction product in Example 1.

The proportioning of the ingredients was as follows:

60.0% kerosene (deodorized)
11.0% stearic acid (Neo Fat 1-50)
3.3% Atlas Renex
6.0% magnesium carbonate
1.8% monoethanolamine
17.9% water The above ingredients were formulated as follows: The stearic acid, kerosene and the Renex were blended together at a temperature of about 70° C., and then the batch cooled to about 30 to 35° C. and the monoethanolamine added. The magnesium carbonate pigment was dispersed in the water content by agitation, and this dispersion was added to the mix. The batch was agitated to form a final emulsified product. The final composition was a stable whitish emulsion quite similar in general characteristics to the composition produced according to Example 1.

The composition made according to Example 2 was equally effective in preventing foaming of various materials, including latex emulsions.

Example 3

As a further example we prepared a composition in which an oil dispersed pigment was employed in place of the soluble metallic salt of Example 1, or the pigment dispersed in water as in Example 2.

The proportioning of the ingredients was as follows:

60.5% kerosene (deodorized)
13.5% stearic acid (Neo Fat 1-58)
3.7% Atlas Renex
13.5% alumina hydrate (flushed)
2.0% monoethanolamine
6.8% water The above ingredients were compounded as follows: The stearic acid was melted together with a part of the kerosene at a temperature of about 70° C. The flushed alumina hydrate was dispersed in the remaining part of the kerosene, and was then added to the mix, after which the batch was cooled to about 30 to 35° C. The Atlas Renex was added while the batch was being stirred, and then the monoethanolamine and water were added. The batch was then agitated to form a final emulsified product. The composition obtained had the same general characteristics as the composition obtained from Examples 1 and 2.

In general, and assuming that the composition is compounded from an organic acid (e. g. stearic), an oil (e. g. kerosene), an emulsifying agent (e. g. Renex), a metallic pigment (e. g. the reaction product of aluminum chloride with monoethanolamine), an organic base (e. g. monoethanolamine) and water, the proportions may range as follows:

50 to 70% oil (e. g. kerosene)
10 to 15% organic acid (e. g. stearic)
2 to 6% emulsifying agent (e. g. Atlas Renex)
5 to 10% metal pigment or salt (e. g. aluminum chloride)
1 to 5% organic base (e. g. monoethanolamine)
10 to 30% water The foregoing general range of ingredients is specified to make clear that the invention is not limited to a specific proportioning of the ingredients, or to certain of the ingredients disclosed herein by way of example.

It will be evident that our composition and method is of great value in facilitating the processing and manufacture of latex emulsions, the marketing of such materials, and the introduction of the same into various mixtures by paint manufacturers. Our composition can be added to the latex emulsion before it is sold to the trade for incorporation with other ingredients, or the processors that desire to use latex emulsion with other ingredients may incorporate our composition into their mixtures.

In addition to its use with latex emulsions, the process is believed applicable to a wide variety of liquors where foaming produces serious processing difficulties, including for example, the previously mentioned sulphite liquors encountered in the wood pulp industry, and proteinaceous liquors encountered in the manufacture and processing of protein glues.

We claim:

A composition having defoaming properties comprising from 50-70% by weight of kerosene; 10-15% by weight of stearic acid; from 2 to 6% by weight of a poly-oxyethylene ester of tall oil; from 5 to 10% by weight of a deflocculated, finely-divided compound selected from the group consisting of alumina hydrate and magnesium carbonate; from 1 to 5% by weight of monoethanolamine; and from 10 to 30% by weight of water, the composition being substantially free of metallic soap and containing the reaction product formed by the reaction of the fatty acid with the organic base, the composition being in the form of an oil-water emulsion and exhibiting marked immediate and sustained defoaming action when added to latices normally susceptible to foaming.

References Cited in the file of this patent

UNITED STATES PATENTS

| | | |
|---|---|---|
| 1,398,891 | Damon | Nov. 29, 1921 |
| 1,735,547 | Reel et al. | Nov. 12, 1929 |
| 1,930,845 | Ulrich et al. | Oct. 17, 1933 |
| 2,269,529 | Goldsmith | Jan. 13, 1942 |
| 2,446,806 | Bernard | Aug. 10, 1948 |
| 2,461,352 | Smith et al | Feb. 8, 1949 |
| 2,562,119 | Haon | July 24, 1951 |
| 2,587,268 | Roberts | Feb. 26, 1952 |